United States Patent Office 3,629,184
Patented Dec. 21, 1971

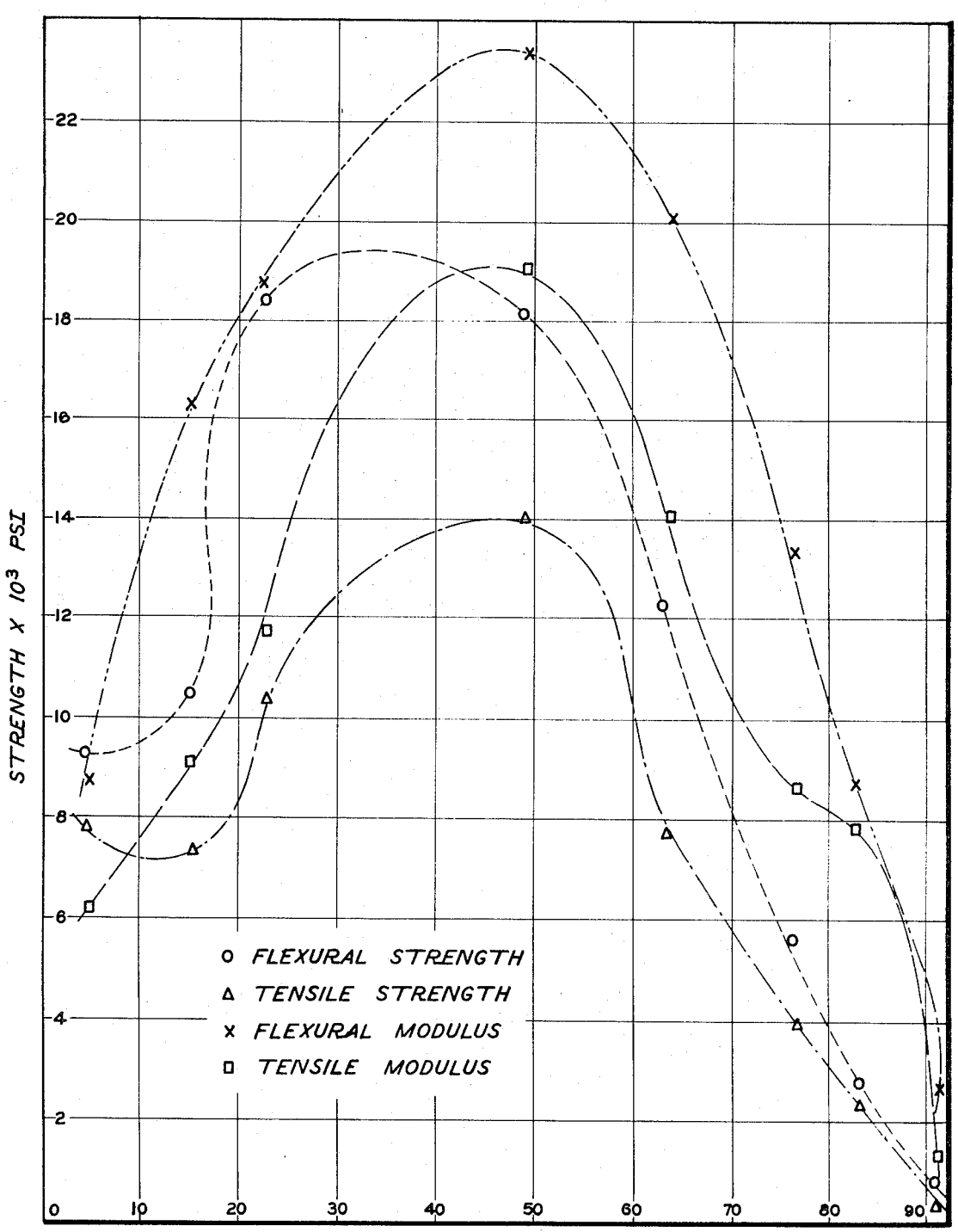

3,629,184
WHISKER REINFORCED BINDERS FOR LAMINATED COMPOSITES AND ADHESIVES
Antoine Kawam, Washington, D.C., and Michael V. Ernest, Baltimore, Md., assignors to W. R. Grace & Co., New York, N.Y.
Filed Sept. 23, 1968, Ser. No. 761,579
Int. Cl. C08g 51/04
U.S. Cl. 260—38     7 Claims

ABSTRACT OF THE DISCLOSURE

A method of preparing laminates, adhesives, and molding materials in which B-staging of resin is carried out before combination with the reinforcing fabric.

DESCRIPTION OF THE INVENTION

The conventional method of preparing reinforcing laminates is to dip the cloth such as glass cloth, for example, into a resin (either liquid or as solvent solution) until the proper amount of resin adheres to the cloth. This dipped cloth is then heated for varying times and at varying temperatures to remove the resin solvent and to partially cure the resin in the cloth. Laminates are prepared from a series of sheets of this partially cured resin-cloth matrix by laying up the sheets and subjecting the composite to pressing and a final heat curing step.

This process has several obvious disadvantages. It is difficult to get the proper amount of resin on the cloth by the dipping technique. This system also requires large installations for curing the resin impregnated sheets of cloth since they must be hung in the precuring area since the precuring (or B-staging) cannot be carried out on a roll of the resin impregnated cloth.

B-staging is a well known term of art relating to the partial curing of a liquid resin to the point at which it becomes a tack free solid. The B-staged resin on further treating will melt or flow sufficiently so that the desired physical properties are developed in the composite in the final curing stage.

In addition, since the resin used for the impregnation is in a solvent, the excess solvent must be removed from these sheets. This removal is subject to the usual fume disposal and fire hazard problems.

Various efforts have been made to combine fibers designated "whiskers" into resin composites that would be used to provide the composite for preparation of these binders and adhesives.

These "whiskers" are fibers that have a high length to diameter ratio. This ratio must be in excess of 1,000 to 1. The most difficult problem to overcome in this system is achieving thorough mixing of the whiskers with the resin. In the past, this mixing has been carried out using whiskers prepared by various techniques and ball milling these whiskers with the resin. The results have not been particularly encouraging. It has been difficult to get loadings of greater than about 4% by weight of the whisker fibers into the liquid resin composite before the mixture turns solid, so that little effective reinforcement was observed. The lack of reinforcement can best be explained by insufficient volume loading since the literature emphasizes that the critical volume content of the reinforcing materials must be substantially above four weight percent (two volume percent), e.g., above 30 weight percent.

We have found that an excellent binder reinforced with whiskers can be prepared by B-staging the resin to be used so as to convert it to a solid which is still not completely cured, and feeding the solid resin into a fluid energy mill with the desired amount of chrysotile asbestos or other fibrous material. The resulting composite can be used directly as a molding powder, or it can be compacted into a sheet and used as a binder for laminating composites or as an adhesive if desired.

An additional advantage of fluid energy milling is that uniform blends of resins and whisker can be produced with any desired weight loading of whisker. In the mill several things happen (1) the bundles of asbestos are opened to individual whiskers, or fibers, (2) the solid resin is ground to a fine powder, (3) both (1) and (2) occur simultaneously, thus initimately blending the two components.

When the composite sheets are used in lamination a layer of reinforcing cloth is laid down, a sheet of the composite is added; and additional layers of cloth and additional sheets of binder are then added until a laminate of the desired thickness is achieve. The laminate is then pressed and molded. The resin flows and wets the cloth resulting in a strong laminate.

Our novel process is advantageous over the processes of the prior art in that it achieves the desired result without the necessity of dipping the cloth to be laminated into the resin, with attendant problems in removal of solvent and B-staging resin on cloth. This is achieved by B-staging the resin prior to being used and adding the resin and the whisker material, generally asbestos, to the fluid energy mill. In the fluid energy mill, the fibers of asbestos are opened to form whiskers of the desired dimension. The mill also achieves very complete mixing of the partially cured resin with the whiskers produced from the asbestos.

Fluid energy mills are well known articles of commerce. They are sold under the tradename of Micronizer, Micron Master, Majack, Jet-O-Mizer among others. The preferred mill is the Micronizer in which the particulate materials are suspended in a gaseous medium and whirled around the enclosed base with additional gases introduced into the whirling body in a manner causing turbulence within the body, comminution of the resin particles and opening of the asbestos fiber bundles.

In operation of the fluid energy mill using air as a gaseous grinding medium, suitable pressures range from about 100–500 pounds per square inch gauge. Since a resin is one of the components being milled, it is preferred to operate the mill at ambient temperature.

The first step of our process is the milling step. In this step, the solid B-staged resin and the asbestos to be converted to whiskers, or other fibers are fed to the mill. Suitable resins include B-staged, solid epoxy resins, phenolics, urea-formaldehyde, melamine-formaldehyde, polyimides, polybenzimidazoles, etc. The material used to produce the whisker can be any material that will yield fibers having the desired properties. Asbestos is particularly preferred. Chrysotile asbestos gives very satisfactory results. The asbestos normally is marketed as bundles of fibers. The mill opens these bundles and reduces the asbestos to a mat of fibers that combines more readily with the solid resinous materials. Since the resin has already been B-staged, it is a solid but still melts at relatively low temperatures and flows well so that the mixture of resin and asbestos can be easily bonded to the glass fabric sheets. Also, if desired, whiskers of other materials, such as aluminum, silicon nitrile, silicon carbide, can be purchased and fed to the mill. In this case the function of the mill is to grind resin and effect efficient, uniform blending of the resin and whisker.

The feed rate of the resin and asbestos to the mill depends on the size of the mill. In an 8 inch mill for example, the resin is fed into the mill at a rate of about 30 to 240 pounds per hour, preferably about 100 to 180 pounds per hour, depending upon the size and capacity of the mill. The asbestos is fed into the mill as received from the vendor without any pretreatment. It is fed into the mill at a rate of about 100 to 300 pounds per hour, preferably about 180 to 220 pounds per hour. The feed rates, of course, are dependent on the asbestos content of the final resin-asbestos mix. The epoxy resins, for example, can accommodate up to 90% asbestos fibers.

After the resin-asbestos product is recovered from the mill, it can be used directly as a molding compound or adhesive or can be formed into a sheet by calendering, pressing or any other suitable technique. At this stage, the product is ready for use as an adhesive or fabrication of laminates. Since the resin is only partially cured, it melts at relatively low temperatures, flows well, and wets the other components of the laminate.

The next step of the process is not part of this invention. It involves utilization of the whisker reinforced materials in preparation of the laminate. This can be done by any conventional technique. One method of preparing laminates of whisker loaded epoxy-glass cloth involves the following steps: The fluid energy-milled epoxy-asbestos mixes are pressed into sheets and these sheets are cut the same size and placed in a mold in alternate layers with glass cloth. The dry lay up can be cured by pressing under heat to pressures from 100 to 5000 p.s.i.g., depending upon the resin and properties desired. If voids are a problem, higher pressures can be used to eliminate the voids and allow the resin to sufficiently wet out the cloth.

Our invention is further illustrated by the following specific but non-limiting examples.

Example I

This example illustrates the advantage of the fluid energy milling over blending with a V-blender or mixing with a ball mill at different asbestos and resin matrix levels.

In this series of runs, compositions were made up to contain varying weight percentages of asbestos and resin using the asbestos sold commercially as Plastibest-20, a special grade sold by Johns-Manville Corporation. The resin system was from Epon 1001, dicyandiamide-benzyldimethylamine (BMDA). The asbestos and matrix resins were mixed in the following weight percents asbestos: 90, 85, 75, and 65. The mixes were made in a blender, a ball mill and in the fluid energy mill. Samples of the mixes of each of these processes were molded at a pressure of 1,000 p.s.i.g. and a temperature of 325° F. for a period of one hour. The tensile and flexural strengths were measured using standard ASTM techniques. The data collected in this series of runs set out in Table I below:

TABLE I

| Run Number | Composition in weight percent | | Mixer used | Laminate properties | |
|---|---|---|---|---|---|
| | Asbestos | Matrix | | Tensile strength in p.s.i. | Flexural strength in p.s.i. |
| 1 | 90 | 10 | V blender | 1,841 | 5,363 |
| 2 | 90 | 10 | Ball mill | 1,162 | 5,994 |
| 3 | 90 | 10 | FEM [1] | 12,400 | 16,422 |
| 4 | 85 | 15 | V blender | 6,672 | 12,282 |
| 5 | 85 | 15 | Ball mill | 3,286 | 10,360 |
| 6 | 85 | 15 | FEM [1] | 13,896 | 16,646 |
| 7 | 75 | 25 | V blender | 9,465 | 16,240 |
| 8 | 75 | 25 | Ball mill | 8,073 | 13,894 |
| 9 | 75 | 25 | FEM [1] | 15,803 | 16,422 |
| 10 | 65 | 35 | V blender | 11,658 | 23,551 |
| 11 | 65 | 35 | Ball mill | 8,780 | 18,988 |
| 12 | 65 | 35 | FEM [1] | 17,774 | 25,325 |

[1] Fluid energy mill.

As apparent from review of the data, the product prepared in the fluid energy mill gives laminates having better tensile and flexural strengths than products prepared in the conventional mixers. The improvement is particularly dramatic in the mix containing 90% asbestos. The tensile strength of the fluid energy milled product is more than six fold greater than the tensile strength of the product prepared in the V Blender.

Example II

In this series of examples, laminated sheets were prepared by fluid energy milling mixes of Plastibest-20, a special asbestos fiber sold by Johns-Manville Corporation and Epon 1001-dicyandiamide-benzyldimethylamine (BMDA). The Epon 1001 is a commercially available epoxy resin sold by Shell Chemical Company. The other ingredients are sold by American Cyanamid and Miller-Stevenson Companies respectively. The mixes were prepared by injecting varying amounts of the components into a fluid energy mill operated at pressures of 250 p.s.i. In the first step of this series of examples, a milled material was made by milling a mixture of 75% resin and 25% asbestos. The mixture recovered from the mill was cold compressed at 750 p.s.i. in a mold having an area of 49 square inches. A thin sheet was formed. Four 3" squares of glass cloth were layed up in alternate layers. The outer layers were the resin-asbestos sheets. The dry lay up was placed in a 3" square mold and cured at a temperature of 400° F. for 1 hour at a pressure of 100 p.s.i. Little squeeze out was observed. The laminate had an excellent appearance. The composition of the laminate was as follows.

| | Percent |
|---|---|
| Asbestos fiber | 18.9 |
| Glass cloth | 24.5 |
| Resin | 56.6 |

There was good wetting out of the cloth.

Example III

A sheet of asbestos-resin was formed using the same technique as Example II except that a composition of equal parts by weight of asbestos and resin are fed to the mill. Four squares of the asbestos-resin sheet and three 3" squares of glass cloth were prepared into a laminate and molded at 100 p.s.i. and 400° F. for one hour. The specimen recovered contained:

| | Percent |
|---|---|
| Resin | 37.8 |
| Asbestos fiber | 37.8 |
| Cloth | 24.4 |

Good quality and good wetting of the cloth was observed.

Example IV

A separate portion of the material prepared in Example III was partially cured by heating the dry lay up at 100° F. for 10 minutes to fuse the low melting resin. The uncured structure had reasonably good strength and could be handled easily. It was found that the material could be finally cured at any time when desired.

Example V

In this example, a partially cured resin laminate structure was prepared by fluid energy milling a mixture 25% of the asbestos and 75% of the resin of Example II. The sheets were prepared as in Example II by cold pressing at 750 p.s.i. The laminate was made as before by laying up alternate 3" squares of glass cloth and the resin-asbestos sheets. In this case, the faces of the laminate were glass cloth. The dry lay up was pressed at 100 p.s.i. at 100° F. for one hour. It had excellent integrity and could be handled easily. The laminate was finally cured by pressing at 100 p.s.i. at 400° F. for one hour. Good wetting out of the cloth was observed. The composition of the laminate was:

| | Percent |
|---|---|
| Asbestos fiber | 15.7 |
| Resin | 46.8 |
| Glass cloth | 37.5 |

Example VI

In this example, melamine-formaldehyde laminating resin was substituted for the epoxide resin of Examples I through V. The melamine laminating resin used was the product sold commercially as Cymel 406 by American Cyanamid Company. A sheet of this mixture was prepared by fluid energy milling a mixture of 65% melamine resin and 35% asbestos. The product was cold pressed at 1,000 p.s.i. using the technique described in Example II. Four 3″ squares of the sheet were laid up with three squares of glass cloth to form a dry lay up. The lay up was cured at 1,000 p.s.i. at 325° F. for ½ hour. The laminate was of good quality.

Examples VI–X

The mechanical properties of these laminates were studied by preparing a series of laminates using the techniques described in Example II. All of the laminates contained three plies of glass cloth. The amount of resin and asbestos used in the reinforcing lay up was varied as indicated in Table II. The laminates were cured at 325° F. for 1 hour at 100 p.s.i. pressure followed by an oven post-cure at 325° F. for two hours.

TABLE II

| | Composition in weight percent | | | | Laminated properties | |
|---|---|---|---|---|---|---|
| Example | Glass cloth | Resin | Asbestos | Density, grams/cc. | Tensile strength in p.s.i. | Flexural strength in p.s.i. |
| 7 | 40 | 57.2 | 2.8 | 1.65 | 24,258 | 33,410 |
| 8 | 40 | 50.8 | 9.2 | 1.55 | 21,170 | 31,378 |
| 9 | 40 | 46.2 | 13.8 | 1.43 | 26,263 | 17,721 |
| 10 | 40 | 30.4 | 29.6 | 1.35 | 2,232 | 9,350 |
| 11 | 40 | 22 | 38 | 1.33 | 2,520 | 3,028 |

Table II shows the composition, density and some of the mechanical properties of these laminates. The general trend of the data is to decreasing strength with increased asbestos content. Although the tensile strength of the product of Example IX is as good as the product of Example VII, the data indicate that better results could be obtained at higher fiber loading and higher pressure.

Examples XI–XII

The utility of the products of our novel process as adhesives is illustrated by using the asbestos resin matrices as adhesives. The fluid energy milled epoxy resin-asbestos composites of the previous examples were pressed into thin sheets and the adhesion to aluminum was studied.

Samples of the epoxy resin-Plastibest product containing 15 and 5% asbestos, respectively, were compressed at 3,000 p.s.i. The product had a thickness of 10 to 20 mils. One inch squares were cut and fed into a 1 inch over lap joint of two pieces of aluminum. The specimen was clamped in an oven and cured at 325° F. for 1 hour. The samples were tested for lap shear strength using standard ASTM procedures. The data are shown in Table III.

TABLE III

| | Adhesive composition | | Lap sheer strength, p.s.i. |
|---|---|---|---|
| Examples | Abestos | Resin | |
| 12 | 15 | 85 | 2,595 |
| 13 | 5 | 95 | 3,522 |
| Commerical standard adhesive. | 50 Glass cloth. | 50 Epoxy resin. | 3,360 |

It is apparent from the data that our novel process provides a satisfactory method of adding whiskers to a resin having adhesive properties. When the composite prepared according to our process is used as an adhesive the lap sheer strength is comparable to that achieved by a commercial adhesive.

Example XIV

This example illustrates the utility of our novel product as a molding powder.

A series of composites were formed using mixtures of Epon 1001 dicyandiamide-benzyldimethylamine (BMDA) and the asbestos sold commercially as Plastibest-20. The mixtures were processed in the fluid energy mill using the techniques described in Example II. The product recovered from the mill was molded at a pressure of 100 p.s.i. using conventional molding techniques. The tensile and flexural strength of the moldings were determined. The data is collected in Table IV and is shown graphically in the figure.

TABLE IV

| Weight percent | | Tensile strength in p.s.i. | Fluxural strength in p.s.i. |
|---|---|---|---|
| Asbestos | Matrix | | |
| 10 | 90 | 7,636 | 9,256 |
| 20 | 80 | 8,010 | 18,125 |
| 30 | 70 | 1,230 | 19,310 |
| 40 | 60 | 1,380 | 19,010 |
| 50 | 50 | 1,395 | 18,000 |
| 60 | 40 | 1,010 | 14,005 |
| 70 | 30 | 685 | 8,000 |

It is apparent from these data that the tensile and flexural strength of the moldings increases rapidly up to a maximum loading between 20 and 40 percent asbestos and then drops off rapidly. The moldings containing from 20 to 40 percent asbestos compare favorably with commercial molding powders.

Obviously, many modifications and variations of the invention may be made without departing from the essence and scope thereof and only such limitations should be applied as are indicated in the appended claims.

What is claimed is:

1. A process for preparing a binding composition which comprises simultaneously feeding asbestos and a partially cured thermosetting resin selected from the group consisting of epoxides, phenol-formaldehyde, urea-formaldehyde, melamine-formaldehyde, polyimidazoles, and polyimides to a fluid energy mill, operated at air pressures of 100 to 500 pounds per square inch and at ambient temperature, in quantities such that the asbestos makes up from 10 to 90 percent of the composition, recovering the resin-asbestos composite from the mill and pressing the composite into sheets to prepare the reinforced binding composition product.

2. The process according to claim 1 wherein the asbestos is chrysotile asbestos.

3. The process according to claim 1 wherein the thermosetting resin is an epoxy resin, the asbestos is chrysotile asbestos, said asbestos making up from 10 to 90 percent of the binder product.

4. A binder composition comprising an intimate mixture of 10 to 90 percent of fibers selected from the group consisting of asbestos, aluminum and, silicon nitride, having the length to diameter ratio of 1000 to 1 and 90 to 10 percent of a partially cured thermosetting resin selected from the group consisting of epoxy resins, phenolic resins, urea-formaldehyde resins, melamine-formaldehyde resins, polyimide resins and polybenzimidazole resins.

5. A process for preparing a molding composition which comprises subjecting asbestos and a partially cured thermosetting resin to the grinding action in a fluid energy mill in a current of air, removing the resin-asbestos composite and recovering the molding composition.

6. The process according to claim 5 wherein the asbestos is chrysotile asbestos.

7. The process according to claim 5 wherein the thermosetting resin is selected from the group consisting of epoxides, phenol-formaldehyde, urea-formaldehyde, melamine-formaldehyde, polyimides, and polybenzimidazoles.

References Cited

UNITED STATES PATENTS

| 3,293,205 | 12/1966 | Doyle et al. | 260—37 X |
| 3,297,599 | 1/1967 | Eschen | 260—38 X |
| 3,354,114 | 11/1967 | Doyle | 260—37 Ep X |
| 3,376,239 | 4/1968 | Pfeiffer | 260—39 X |
| 3,396,139 | 8/1968 | Snedeker | 260—37 Ep |
| 3,246,950 | 4/1966 | Gruber | 260—37 Ep X |
| 3,338,677 | 8/1967 | Berry | 260—37 Ep UX |
| 3,415,779 | 12/1968 | Preininger et al. | 260—37 Ep X |

MORRIS LEIBMAN, Primary Examiner

L. T. JACOBS, Assistant Examiner

U.S. Cl. X.R.

260—37 Ep, 37 N, 39 R